July 22, 1958

H. RICHTER 2,843,956

TRANSFER MACHINE

Filed Aug. 2, 1954

INVENTOR.
Henry Richter,
BY
Smith, Olsen, Baird & Gulbrandsen
Atty's.

United States Patent Office 2,843,956
Patented July 22, 1958

2,843,956

TRANSFER MACHINE

Henry Richter, Kankakee, Ill., assignor to Paramount Textile Machinery Co., Kankakee, Ill., a corporation of Illinois Application August 2, 1954, Serial No. 447,303

13 Claims. (Cl. 41—1)

This invention relates to improvements in transfer machines adapted for use in transferring to different parts of garments, such as hosiery, labels which are preferably in the form of indicia made of waxy material and carried by movable paper tapes or strips from which they are transferred to the hosiery by the application of heat.

It is desirable, in the manufacture of hosiery, to place indicia at a plurality of places such as the heel, sole and toe portions of the foot and, in order to make the transfer applicable to hosiery of different sizes and shapes, it is necessary to use a plurality of tapes carrying the indicia and to synchronize the movements of the tapes so that the indicia will be applied at the desired locations on the hosiery.

The principal object of the present invention, therefore, is to provide an improved transfer machine comprising novel means for synchronizing the movements of the tapes by which the indicia are carried. Another object is to provide novel means for moving the tapes and for adjusting their relative positions. A further object of the invention is to provide novel mechanism, including means actuated by the indicia on the moving tapes, for actuating the devices by which the transfer of indicia from the tapes to the hosiery is effected. Still another object of the invention is to provide novel means for preventing the operation of the transfer devices when there is no hosiery in position to receive the indicia. Other objects of the invention relate to various features of construction and arrangement which will appear more fully hereinafter.

The nature of the invention will be understood from the following specification taken with the accompanying drawings in which one embodiment is illustrated. In the drawings.

The invention is illustrated in the drawings as being embodied in a machine comprising a frame 20 having legs 20a, adapted to rest upon the floor, lower longitudinal side frame members 20b, upper longitudinal side frame members 20c, and transverse end frame members 20d, which members support a flat horizontal table top 21 over which the transfer operations take place. This table top has, at the forward end of the machine, two longitudinal side portions 21a and three parallel intermediate portions 21b, 21c and 21d over which the indicia carrying tapes 22, 23 and 24 are adapted to move beneath the hosiery 25 to which the indicia are to be transferred. The adjacent edges of the table portions 21a, 21b, 21c and 21d are connected by depressed portions which form parallel longitudinal grooves occupied by the upper stretches of endless V-shaped conveyor belts 26, 27, 28 and 29 which move the hosiery 25 rearwardly to the transfer position.

The tapes 22, 23 and 24 carry indicia 30 which are spaced uniformly apart, with the same spacing on each tape, and they are supplied from coils 32, 33 and 34 which are mounted on rotatable shafts 35 journaled in bearings carried by the vertical frame members 20e. The tapes extend around a roller 36 (Fig. 1) and thence upwardly through switch actuating devices 37 to points where they pass over rolls 38, 39 and 40 preliminary to passing over the table sections 21b, 21c and 21d. The tapes are held in contact with the rolls 38, 39 and 40 by rollers 41 mounted on the upper ends of arms 42 which are pivoted at 43a on brackets 43 carried by the frame. The rollers 41 are maintained on the tapes by springs 257 so that the tapes are positively moved rearwardly over the table when the rolls 38, 39 and 40 are driven.

Figure 1:
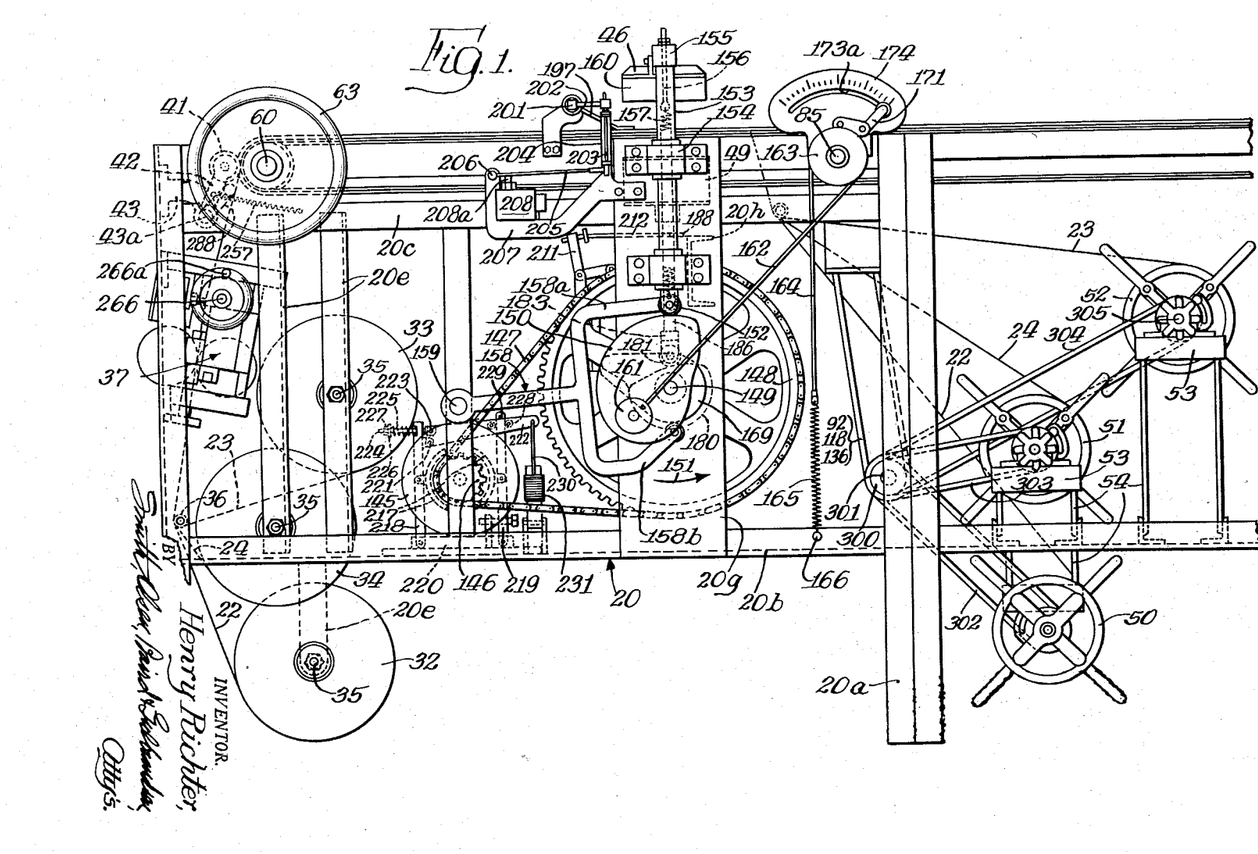
Figure 1 shows a side elevation of the improved transfer machine in which the hosiery and the tapes move toward the right as viewed in this figure.
Figure 2:
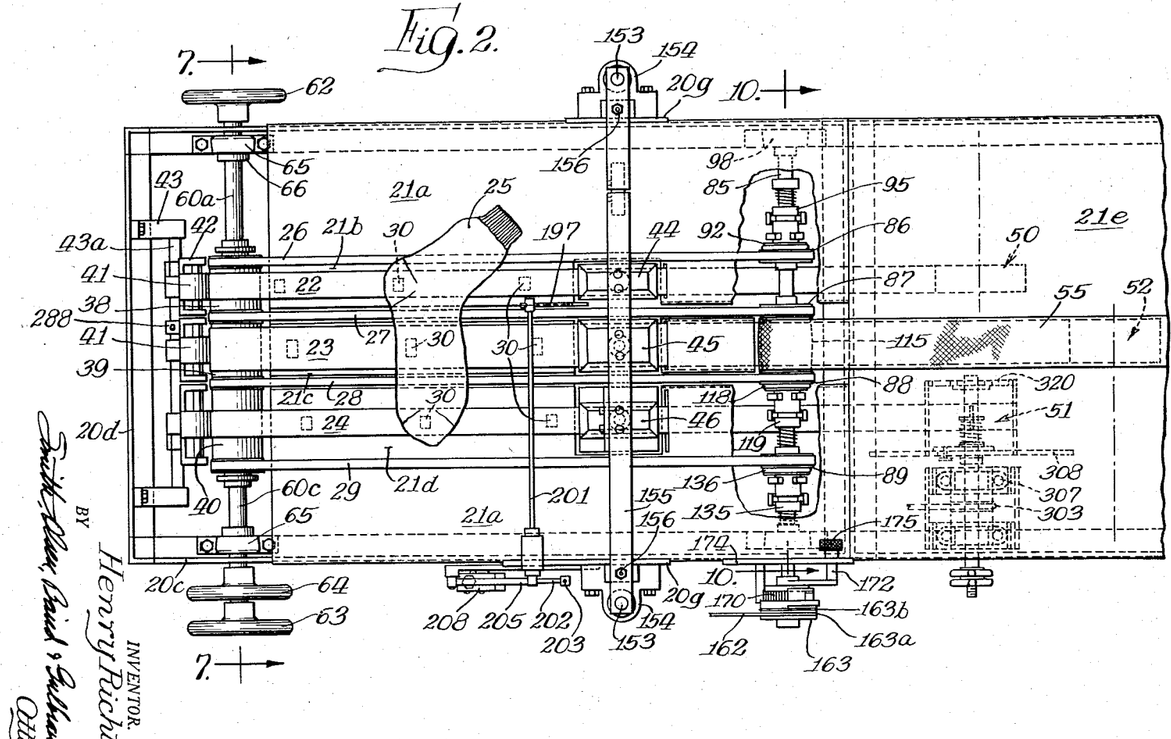
Fig. 2 shows a top plan view of the machine illustrated in Fig. 1.

The transfer position is adjacent the rear ends of the portions 21b, 21c and 21d of the table where the hosiery 25 is pressed downwardly by the pressure platens 44, 45 46 (Fig. 2) which are actuated at the proper times, when the heel, sole and toe portions, respectively, of a stocking are beneath them and when these portions of the stocking are above indicia on the respective tapes 22, 23 and 24, thereby pressing the tapes against the heating shoes 47, 48 and 49 (see Fig. 9) which are then in their elevated operative positions. After passing beneath the pressure platens 44, 45 and 46, the tapes 22, 23 and 24 pass downwardly through slots in the table 21 and are wound on reels 50, 51 and 52, respectively, which are mounted in blocks 53 carried by vertical frame members 54, as shown in Fig. 1. From the transfer position, the hosiery 25 is carried rearwardly over the rear portion 21e of the table by an endless conveyor belt 55.

Figure 7:
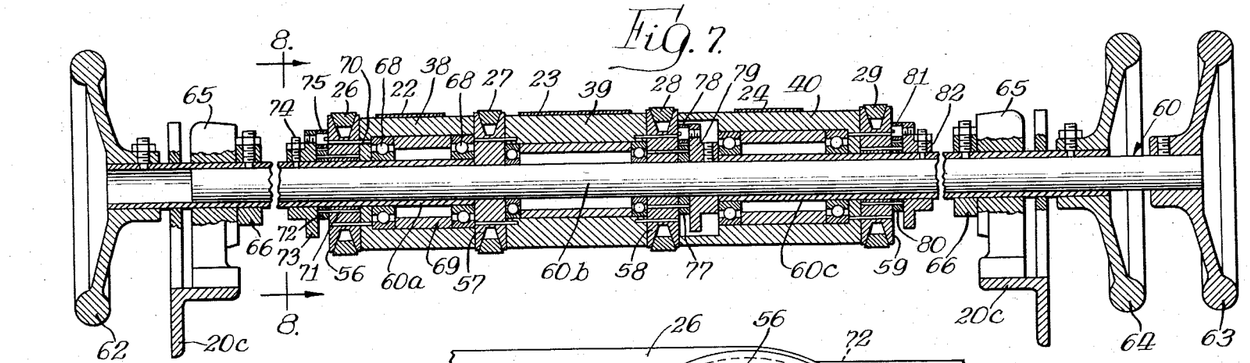
Fig. 7 shows a vertical section taken on the line 7—7 of Fig. 2.

Referring now to the means for supporting the forward portions of the tapes 22, 23 and 24 and the forward portions of the V-belts 26, 27, 28 and 29, reference may be had to Fig. 7 where it appears that these belts pass around V-pulleys 56, 57, 58 and 59, respectively, which are mounted on a composite shaft 60 made up of two hollow shafts 60a and 60c which have telescoping engagement with a solid shaft 60b. The shaft sections 60a, 60b and 60c are capable of being turned manually by hand wheels 62, 63 and 64, respectively, which are secured on their projecting ends. The shaft 60 is journaled on bearings 65 which are fixed on the side frame members 20c. Collars 66 are secured on the shaft sections 60a and 60c adjacent the bearings to hold them against outward endwise movement.

Figure 8:
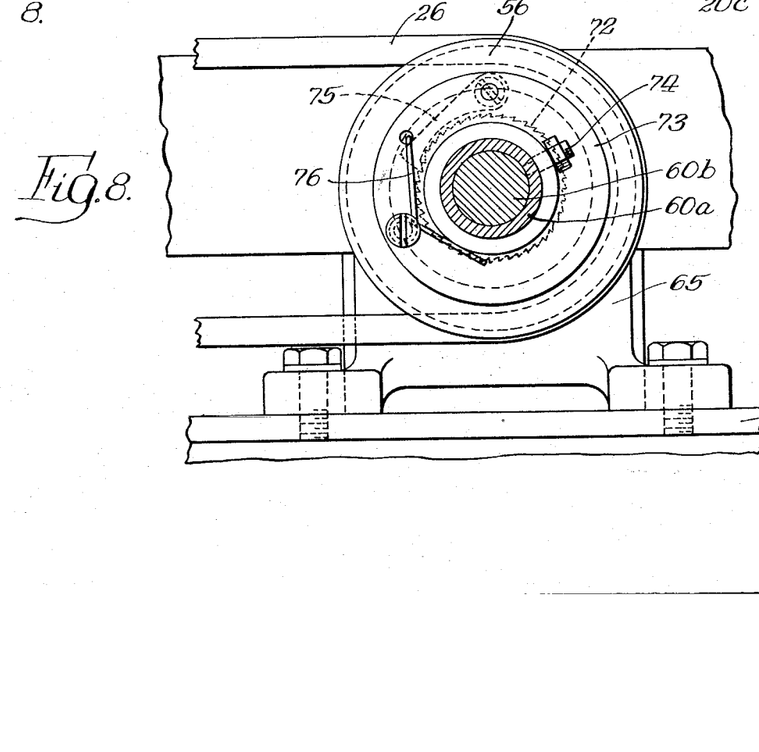
Fig. 8 shows a vertical section taken on the line 8—8 of Fig. 7.

The possible relative rotation of the shaft sections 60a, 60b and 60c is made use of to effect relative adjustment of the tapes 22, 23 and 24 so that the indicia thereon may be properly located with respect to the heel, sole and toe portions of the hosiery. For this purpose the roll 38 carrying the tape 22 is mounted to rotate on the hollow shaft portion 60a through ball bearing units 68 which are spaced apart by a sleeve 69. The roll is secured by pins 70 to the V-pulley 56 which carries the V-belt 26 and this pulley is journaled on the shaft 60a and connected by pins 71 to a ratchet wheel 72 (see Figs. 7 and 8). A disk 73 is secured by a stud 74 to the shaft section 60a and a pawl 75 is pivotally mounted on this disk to engage the teeth of the ratchet wheel under the influence of a spring 76, so that an intermittent rotary motion of the shaft section 60 through manipulation of the hand wheel 62 may be utilized to rotate the roll 38 and thereby advance the tape 22 to the desired extent.

Similarly, the roll 39 is rotatably mounted on the solid shaft section 60b through ball bearing units separated by a sleeve and this roll is pinned to both of the V-pulleys 57 and 58 which are journaled on this shaft section. The V-pulley 58 is pinned to a ratchet wheel 77 which is engaged by a spring actuated pawl 78 mounted on a disk 79 secured to the shaft section 60, so that this shaft section may be rotated by the hand wheel 63 to effect adjustment of the tape 23 carried by the roll 39.

In the same manner, the roll 40 is journaled on the shaft section 60c through ball bearing units separated by a sleeve and this roll is pinned to the V-pulley 59 journaled on this shaft section so that they rotate together. A ratchet wheel 80 is fixed to the V-pulley 59 and is adapted to be actuated by a spring pressed pawl 81 pivoted on a disk 82 secured to this shaft section. Thus, by operating the hand wheel 64, the tape 24 may be adjusted longitudinally to effect the desired location of the indicia carried thereby.

Figures 10, 11:
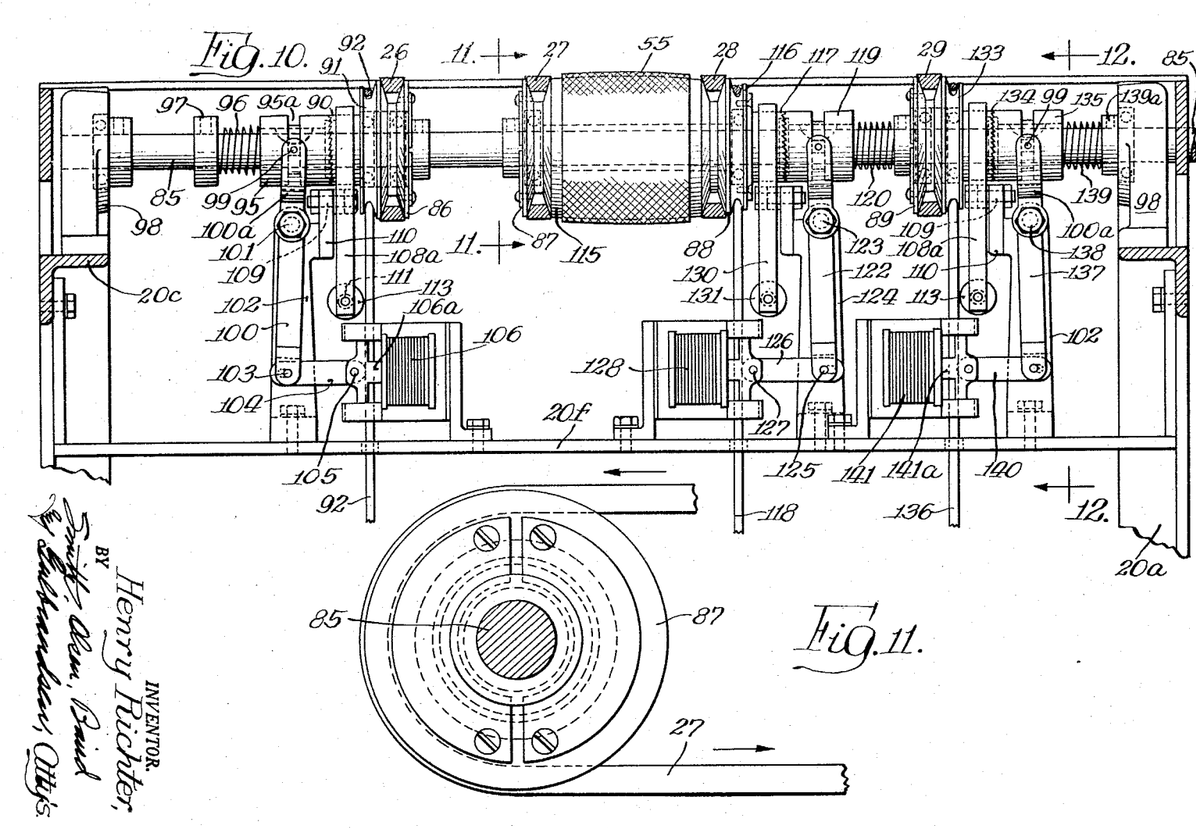
Fig. 10 is a vertical section taken on the line 10—10 of Fig 2.
Fig. 11 is a vertical section taken on the line 11—11 of Fig. 10.
Figures 12, 13, 14:
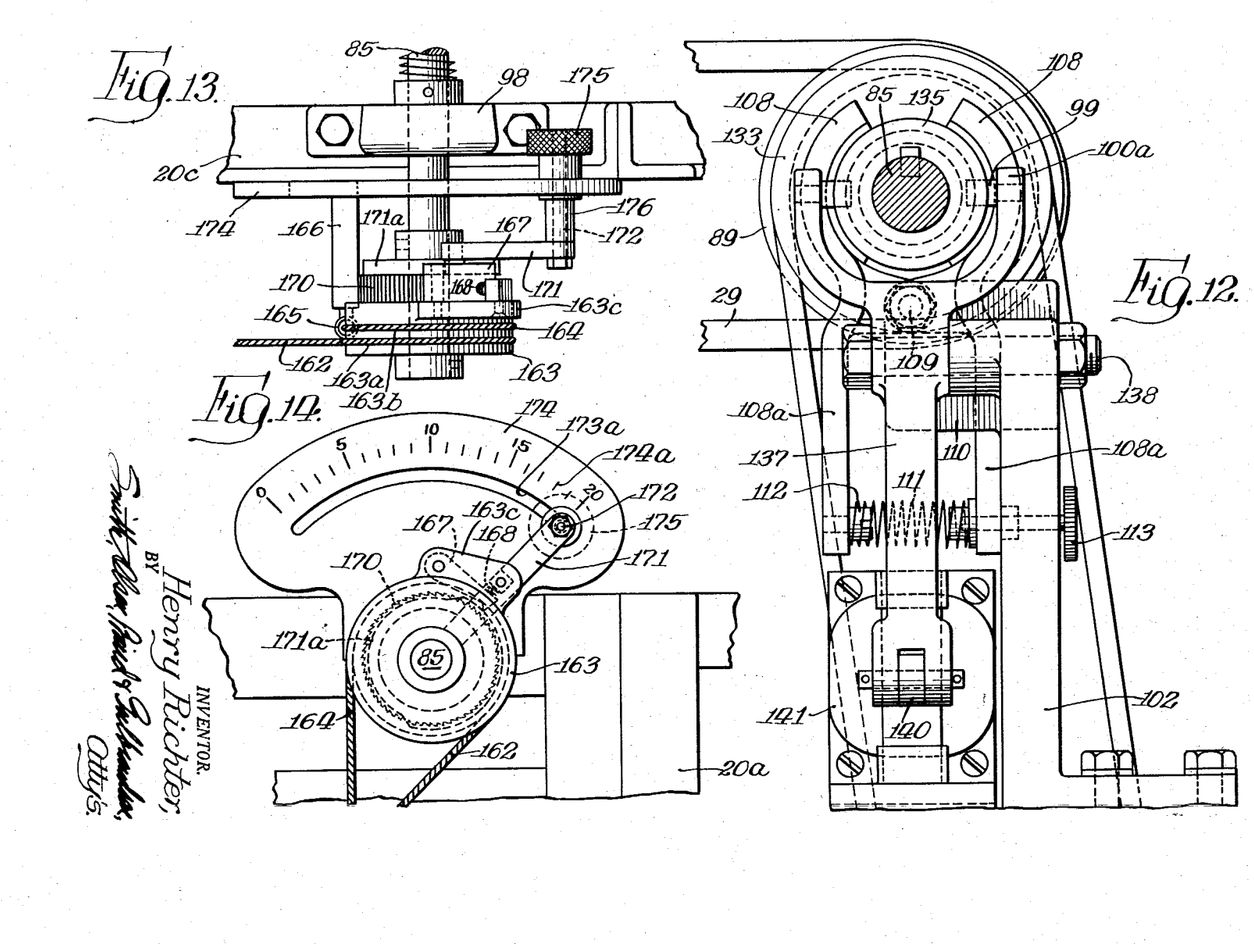
Fig. 12 is a vertical section taken on the line 12—12 of Fig. 10.
Fig. 13 shows a top plan view of the forward portion of the main drive shaft, illustrated in Fig. 10, illustrating the operating connection thereto from the driving motor.
Fig. 14 shows an elevation of the apparatus illustrated in Fig. 13.

As shown particularly in Figs. 1 and 10, a drive shaft 85 is provided for driving the V-belts 26, 27, 28 and 29 through V-pulleys 86, 87, 88 and 89, respectively, which are rotatably mounted on this shaft and adapted to form driving connections therewith through certain solenoid operated clutches. These clutches include a clutch member 90 secured to the pulley 86 through an intermediate round-groove pulley 91 adapted to be engaged by an endless belt 92 which drives the wind-up reel 50 as hereinafter described. The clutch member 90 is adapted to be engaged by a complementary clutch member 95 splined on the shaft 85 and normally moved to engaging position by a coil spring 96 surrounding the shaft and abutting against a collar 97 fixed on the shaft which is journaled on bearing brackets 98 carried by the side frame members 20c. The clutch member 95 has an annular groove 95a engaged by clutch pins 99 (see Figs. 10 and 12) which are carried by the yoke arms 100a of a clutch lever 100 which is pivoted at 101 on a bracket 102 extending upwardly from a transverse frame member 20f. The lower end of the lever 100 is pivoted at 103 to a link 104 which has its other end pivoted at 105 to the core 106a of a solenoid 106 by which the driving of the belt 26 under the heel portion of the hosiery is controlled.

The clutch member 90 is engaged by brake shoes 108 (see Fig. 12) which are formed on the upper ends of brake levers 108a pivoted at 109 on a bracket 110. The lower ends of these levers are separated by a coil spring 111 mounted on lugs 112 so that the shoes 108 are pressed against the clutch member to cause the rotation of the V-pulley 86 to be promptly arrested when the clutch members are disengaged. The compression of the spring 111 may be adjusted by a screw 113 to vary the pressure of the shoes 108 on the clutch member.

The V-pulleys 87 and 88 are connected to an intermediate crowned pulley 115, also rotatably mounted on the shaft 85, which carries the forward portion of the endless conveyor belt 55, so that when these V-pulleys are driven the belt 55 is actuated to carry rearwardly over the table, the hosiery to which indicia have been applied. The V-pulley 88 is connected through an intermediate round-groove pulley 116 with a clutch member 117 rotatably mounted on the shaft 85. The pulley 116 is engaged by an endless belt 118 which drives the wind-up reel 51. The clutch member 117 is adapted to coact with a clutch member 119 splined on the shaft 85. This clutch member is moved to engaging position by a coil spring 120 abutting against the hub of the V-pulley 89 and it is adapted to be operated by a lever 122, similar to the lever 100, which is pivoted at 123 on a bracket 124 secured on the frame member 20f. The clutch operating lever 122 is pivoted at 125 to a link 126 which has its other end pivoted at 127 to the armature 128a of a solenoid 128 by which the driving of the belts 27 and 28 under the sole portion of the hosiery is controlled. The clutch member 117 is controlled by a brake similar to the one which controls the stopping of the clutch 90 and the levers 130 of this brake are adjustable by a screw 131.

The V-pulley 89 which drives the V-belt 29 is secured through an intermediate round-groove pulley 133 to a clutch member 134 which is rotatable on the shaft 85 and adapted to have a driving engagement with the shaft through a clutch member 135 which is splined on the shaft. The pulley 133 is engaged by a belt 136 which drives the reel 52 for rewinding the tape 24. The clutch member 135 has an annular groove engaged by clutch pins mounted in the clutch lever 137 which may be moved about its pivot 138 to compress a coil spring 139 mounted on the shaft with its other end abutting against a collar 139a fixed on the shaft. The lever is pivotally connected to a link 140 which, in turn, is pivotally connected to the core 141a of a solenoid 141 by which the driving of the belt 29 under the toe portion of the stocking is controlled.

The driving shaft 85 is adapted to be rotated intermittently by driving connections extending to the end of the shaft as shown particularly in Fig. 1. These driving connections extend from an electric motor 145 which has a sprocket gear 146 secured on its shaft and arranged to mesh with an endless sprocket chain 147 and to actuate a large sprocket gear 148 mounted upon the cam shaft 149. This cam shaft is journaled in bearings carried by the upright side frame members 20g and it has secured on each end thereof a cam 150 adapted to rotate in the direction of the arrow 151. The cams 150 are adapted to engage rollers 152 mounted upon the lower ends of rods or plungers 153 which slide vertically in bearing brackets 154 carried by the side frame members 20g. The upper ends of the plungers 153 are connected to a transverse bar 155 which has secured to the under side thereof the pressure platens 44, 45 and 46. The ends of the bar 155 are attached by connecting members 156 to coil springs 157 which extend downwardly and are attached to the upper arms 158a of two-armed levers 158 pivoted at 159 on the frame. These springs tend normally to move the pressure platens downwardly and to cause the sponge rubber pads 160 which are mounted on their undersides to engage the hosiery 25 on the table and thereby press it downwardly against the tapes 22, 23 and 24 and against the heating shoes 47, 48 and 49 which are then in their elevated positions. To insure the pressure of the pads on the hosiery in all angular positions of the cam shaft 149, the lower arms 158b of the levers 158 are arranged to be actuated by cams 169 fixed on the shaft 149 so that the springs 157 are extended by these cams when the transfer is made. When the cam shaft 149 is rotated by the driving motor 145, the cams 150 are rotated and periodically elevate the pressure platens 44, 45 and 46 against the tension of the springs 157.

One of the cams 150 has pivotally mounted thereon a disk 161 which is adapted to turn on its pivot as the cam 150 rotates. The peripheral portion of this disk 161 is connected to a cable 162 which extends upwardly and partially around a pulley 163 which has two annular grooves 163a and 163b. This pulley 163 is rotatably mounted upon the driving shaft 85 and the cable 162 extends partially around the groove 163a with its extremities secured to this pulley. Another cable 164 has one end thereof secured in the other groove 163b of the pulley 163 and this cable extends downwardly with its lower extremity attached to a coil spring 165 having its lower end attached to the frame member 20b at 166. Thus, as the cam 150 carrying the disk 161 is rotated by the motor, the cable 162 causes a partial revolution of the pulley 163 and as the cam returns to its initial position, the pulley 163 is returned to its initial position by a spring 165 acting on the cable 164. This intermittent rotary movement of the pulley 163 is made use of to impart a corresponding movement to the drive shaft 85. The mechanism for doing this is illustrated particularly in Figs. 1 and 13 where it will be seen that the pulley 163 has a projection 163c upon which there is pivotally mounted a pawl 167 which is maintained by a spring 168 in contact with a ratchet wheel 170 fixed on the shaft 85. Thus, the oscillatory movement of the pulley 163 causes the shaft 85 to rotate through a partial revolution on each downward movement of the cable 162, thereby causing the V-pulleys 86, 87, 88 and 89 to be driven and to cause corresponding intermittent rearward movements of the hosiery 25 and of the tapes 22, 23 and 24 which carry the indicia. The actuation of the pulley 163 on the shaft 85 may be varied for the purpose of regulating the extent of movement of the hosiery and the tapes on each rotary movement of the cam 150 which carries the disk 161. For this purpose, the shaft 85 has secured thereon an arm 171 which extends radially upward from the shaft and is provided at its upper end with a pin 172 adapted to engage a slot 173a in a fixed quadrant 174 which has a graduated scale 174a adapted to indicate the position of the arm 171. The pin 172 is adapted to be clamped in position on the quadrant 174 by a clamping nut 175 engaging the threaded end of the pin 172 and clamping the quadrant between the nut and a sleeve 176. The arm 171 carries a cam 171a which is adapted to move the pawl 167 out of engagement with the ratchet wheel so that further movement of the ratchet wheel will not move the pulley 163. By adjusting the position of the arm 171, the amplitude of movement of the hosiery and the tapes may thus be regulated by the operator.

The cam shaft 149 also effects the elevation of the heating shoes 47, 48 and 49 to their operating positions by means of two cams 180 which are fixed on the shaft (see Fig. 9) and which engage rollers 181 mounted in brackets 182 secured to the under side of a bar 183. This bar is connected to the lower ends of the plungers 184, 185 and 186 which have mounted upon the upper ends thereof the shoes 47, 48 and 49, respectively, which are heated by internal heating elements connected in an electric circuit. The plungers 184, 185 and 186 are mounted to slide in bearing brackets 187 secured to the transverse frame member 20h and when the cams are in the positions shown in Fig. 9, the heating shoes are elevated to engage the undersides of the tapes 22, 23 and 24. When the heating shoes are in this elevated position they are held there during the continued operation of the machine by a lever 188 which is pivoted at 189 on a bracket 190 carried by the frame member 20h and arranged to be actuated by a spring 191 to cause it to engage notches 184a, 185a and 186a in the plungers.

The lever 188 remains in this position (Fig. 9) until the operation of the machine is stopped either by the operation of a hand lever 195 or by the actuation of a foot pedal 196 or by the actuation of a finger 197 (Figs. 1 and 2) which normally rests upon the hosiery 25 carried by the belts immediately in advance of the position where the transfer takes place. Referring to the first of these operations, the lever 195 is pivotally connected by a rod 198 to the lever 188 so that the lever 195 may be pushed forwardly to disengage the lever 188 from the notches in the plungers 184, 185 and 186. This same disengagement may be effected by operating the foot pedal 196 which has an arm 196a pivotally connected to a rod 199 which is mounted to slide in a bracket and to actuate an arm 195a of the lever 195.

Figure 9:
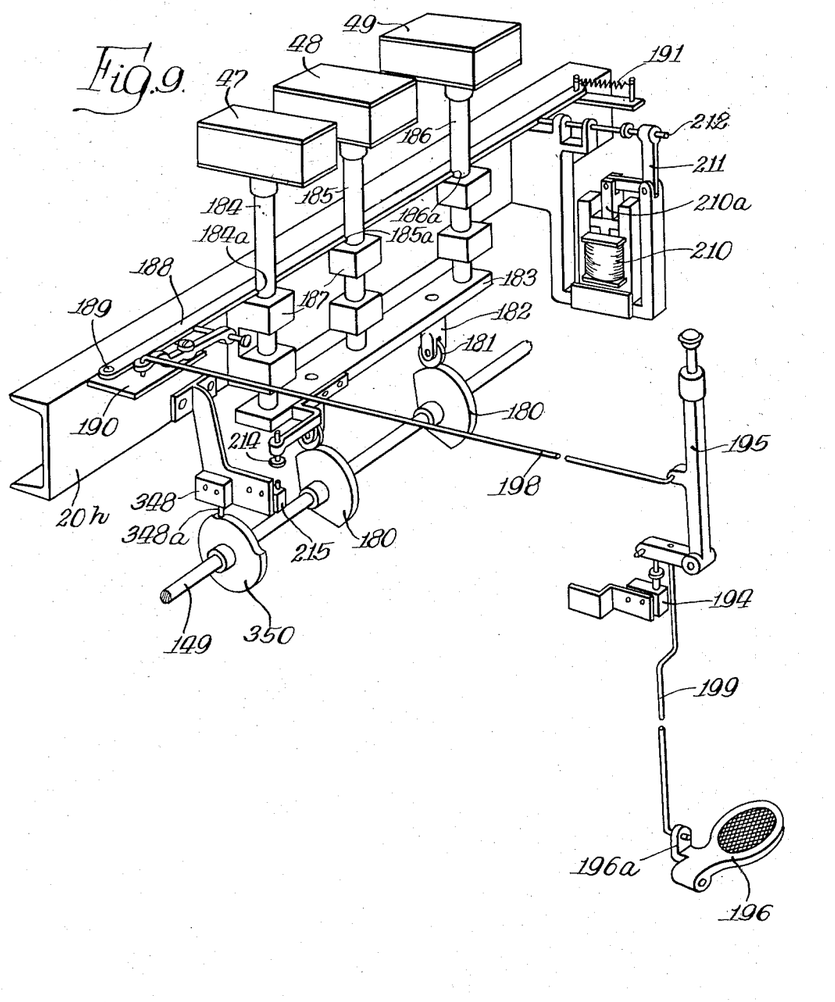
Fig. 9 is a perspective view of the heating shoes and the apparatus by which they are moved to and from the transfer position.

Referring to the third of these operations, the finger 197 is of such length to pass over the gap between adjacent pairs of hosiery without substantial movement but, if the supply of hosiery on the conveyor belts fails, the finger 197 will then drop down and turn its shaft 201 with a resulting angular movement of a lever arm 202 which is mounted on the shaft and which carries a vertical rod 203 mounted for sliding movement in a bracket 204. The lower end of the rod 203 is connected to the free end of a lever 205 which is pivoted at 206 on a bracket 207. The depression of the lever 205 actuates the plunger 208a of an electric switch 208 which is thereby operated to close the circuit of the heating shoe release solenoid 210 (Fig. 9). Upon being energized, the solenoid 210 moves its core 210a downwardly to actuate the bellcrank lever 211 and thereby cause the rod 212 to push the lever 188 out of engagement with the notches in the plungers 184, 185 and 186.

When the heating shoes 47, 48 and 49 are released by the lever 188 by any of the three methods just described, the lowering of the shoes by gravity causes a contact screw 214 to open a normally closed switch 215 which opens the circuit of the motor 145 and stops the machine. In order to insure an instant stoppage of the machine with no further movement of the cam shaft 149 or parts controlled thereby, the shaft of the motor 145 has fixed thereon a brake disk adapted to be engaged by two brake shoes 217 which are pivotally mounted on intermediate parts of upright rods 218 and 219 which have their lower ends pivotally supported on a block 220 mounted on the frame member 20b. The rod 218 is pivoted at 221 to a lever 222 and at a point above this pivot the lever is pivotally connected at 223 to a rod 224 which extends through an aperture in the rod 218 and is engaged by a coil spring 225 which extends between the lever 218 and a washer 226 which is held in adjusted position by a nut 227 engaging the threaded end of the rod. The rod 219 extends between two rollers 228 mounted on the lever 222 and a transverse pin 229 in the upper end of the rod 219 limits the upward movement of this lever.

The spring 225 normally causes an upward swinging of the lever 222 with the result that the upper ends of the rods 218 and 219 are moved toward each other and caused to engage the brake disk. The free end of the lever 222 is connected by a link 230 to a solenoid 231 which is mounted in fixed position in the frame. When the motor 145 is started in operation, the solenoid 231 is energized and the link 230 is actuated to lower the lever 222 and thereby release the brake disk from the brake shoes 217. This condition continues until the circuit of the motor 145 is broken by any of the three methods described above, whereupon the solenoid 231 is simultaneously deenergized, thus causing the brake shoes 217 to be again applied by the spring 225, with the result that the rotation of the motor shaft is instantly arrested.

The intermittent motion imparted to the conveyor belts 26, 27, 28 and 29 and to the tapes 22, 23 and 24 by the intermittent partial rotation of the drive shaft 85 is adapted to be controlled by an electric circuit in which the clutch operating solenoids 106, 128 and 141 (Fig. 10) are connected so that the movement of the conveyor belts and of the transfer tapes will be periodically arrested at the proper times when a stocking is located under the pressure platens 44, 45 and 46. These circuits for controlling the clutches on the shaft 85 are controlled by microswitches 235, 236 and 237 (Fig. 15) which are mounted at the forward end of the machine and adapted to be actuated by the indicia on the transfer tapes 22, 23 and 24, respectively, as these tapes move upwardly from the supply reels 32, 33 and 34.

Figure 3:
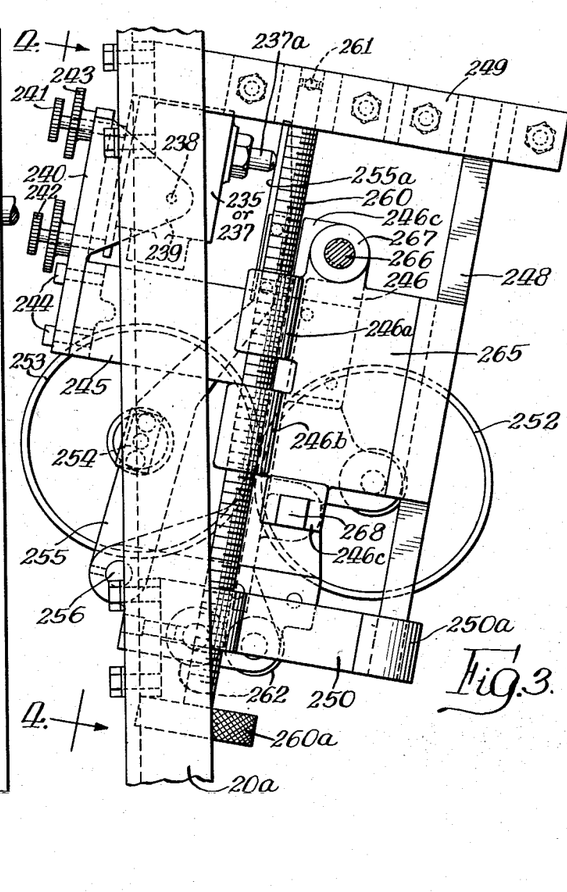
Fig. 3 shows an enlarged side elevation of the apparatus illustrated in Fig. 1 by which the indicia on the moving tape are caused to actuate the transfer devices for applying indicia to the heel and toe portions of the hosiery.
Figure 4:
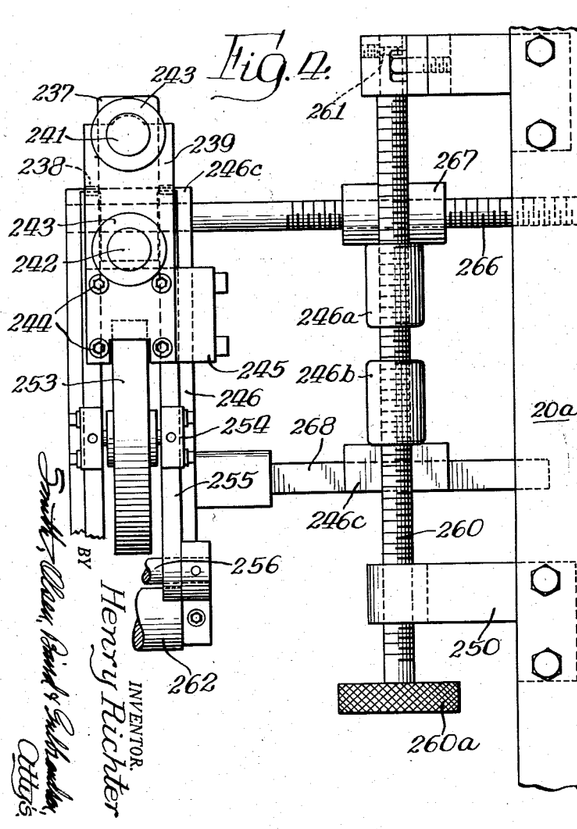
Fig. 4 is a sectional view taken on the irregular line 4—4 of Fig. 3.
Figures 5, 6:
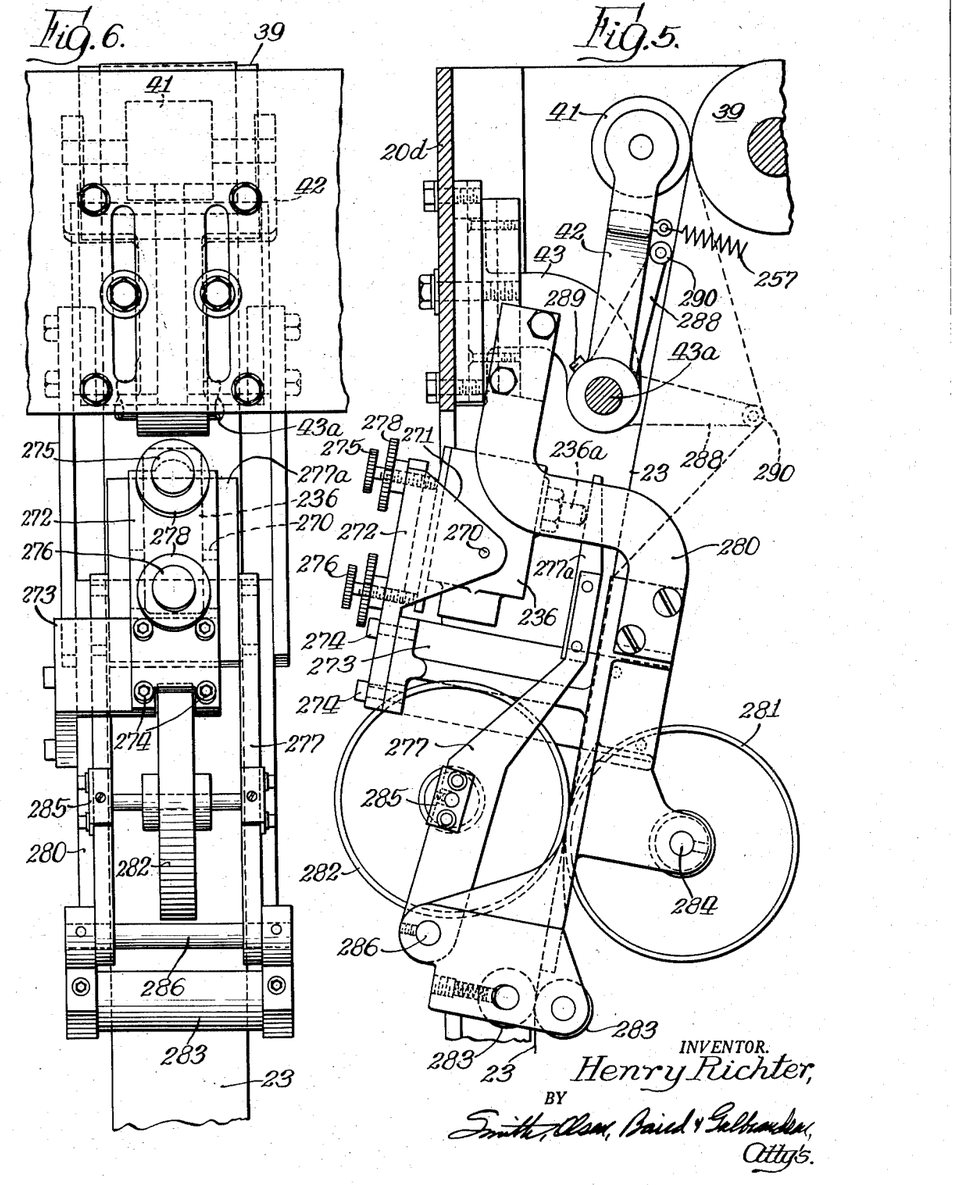
Fig. 5 is a vertical section through the forward portion of the machine giving a side elevation, similar to that of Fig. 3, of the apparatus by which the indicia on the middle tape are caused to actuate the transfer devices for applying indicia to the sole portions of the hosiery.
Fig. 6 shows an end elevation of the apparatus illustrated in Fig. 5.

In Figs. 3 and 4, there is shown the mounting of the microswitch 237 (or 235) which differs from that for the microswitch 236, shown in Figs. 5 and 6, in that means are provided for adjusting the switch laterally to correspond to the position of the heel (or toe) portion of the stocking, thus making the apparatus useful with stocking feet of various sizes. As shown in Figs. 3 and 4, the microswitch 237 is pivoted at 238 between the arms of a U-shaped bracket 239 which is secured to a plate 240. The casing of the switch 237 is engaged by two adjusting screws 241 and 242 which pass through threaded apertures in the plate 240 and are held in adjusted position by lock nuts 243. By adjusting the screws 241 and 242 the microswitch 237 may be located so that its plunger 237a is located in the desired position with respect to a switch operating lever 255. The plate 240 is secured by studs 244 to a bracket 245 which is carried by another bracket 246 adapted to have adjustment laterally and in an upward direction with respect to the table over which the tapes pass. The bracket 246 is mounted for vertical sliding movement on a bar 248 of square cross section which is attached at its upper end to a bar 249 secured to one of the upright frame members 20a. At its lower end, the bar 248 engages a boss 250a formed on the end of a bracket 250 which is also secured to the frame member 20a. The bracket 246 and the parts carried thereby are thus capable of adjustment vertically.

The tape 22 passing upwardly from the reel 32 extends between two wheels 252 and 253 which are of substantial diameter and which have cylindrical surfaces preferably of a width at least equal to the width of the tape passing between them. The wheel 252 is rotatably mounted in a boss carried by the bracket 246 and the other wheel 253 is rotatably mounted in a bearing 254 carried by a switch operating lever 255. This lever is pivoted at 256 on the bracket 246 and it extends upwardly along an irregular line, terminating in a flat portion 255a which is adapted to engage and operate the plunger 237a of the switch 237 in response to the movement of indicia on the tape 22 between the two wheels 252 and 253. The increased thickness of the tape at a point where an indicia is located causes a separation of the wheels 252 and 253 with a resulting pivotal movement of the lever 255 and the length of this lever causes the relative movement of the wheels to be magnified at the point where the switch operating lever engages the plunger of the switch. Thus, the switch 237 is actuated each time that an indicia on the tape passes between the two wheels 252 and 253. The tape then extends upwardly and passes over the roll 40 with which it is held in contact by the roller 41 carried by an arm 42 which is pivoted on a shaft 43a carried by the brackets 43. A coil spring 257 connected to the arm 42 maintains the roller 41 in contact with the strip.

The adjustment of the switch 237 in a general vertical direction is effected by an adjusting screw 260 which is rotatably mounted in the frame member 249 and held in position therein by a pin 261 engaging an annular groove in the screw. The lower threaded portion of the adjusting screw has threaded engagement with bosses 246a and 246b which are formed on the bracket 246 and, at its lower end, the adjusting screw is rotatably mounted in the bracket 250 and carries a knurled handle 260a by which it may be turned to effect movement of the bracket 246 as well as the bracket 245 and the switch 237 either upwardly or downwardly. The lower part of the bracket 246 carries two small rollers 262 which loosely engage opposite sides of the tape and serve as a guide as it passes upwardly to the wheels 252 and 253. When the adjusting screw 260 is operated a casting 265, upon which it is mounted, moves vertically on the bar 248, being provided with a rectangular groove for engagement by the bar.

For the purpose of permitting adjustment of the switch 237 transversely of the machine, there is provided an adjusting screw 266 which is journaled in a boss 246c formed on the upper end of the bracket 246 and which also has an interlocking rotatable engagement with a boss 267 carried by the frame. This adjusting screw has a hand wheel 266a (Fig. 1) which may be turned to cause lateral movement of the switch 237 and during this movement a boss 246c slides upon a rectangular bar 268 carried by the bracket 246 so that the bracket 246 is guided and supported as it is adjusted.

It will be understood that the purpose of the vertical and lateral adjustments of the switch 237 is to locate the tape 22 in proper positon with respect to the toe portion of the stocking, which may be necessary to accommodate different sizes of stockings, and the adjustment also makes it possible to effect a variation in the position of the wheels 252 and 253 so that the indicia on the tape will cause these wheels to be actuated at the proper point in the travel of the tape so that the actuation of the switch 237 by the wheels will take place when another indicia on the same tape is located beneath the pressure platen 46 which presses the last mentioned indicia downwardly against the stocking. The switch 235 which is adapted to be actuated by the tape 24 is provided with similar adjustments so that compensation may be made for the spaced relation of the indicia on the tape and for the position of the heel portion of the stocking on the conveyor.

The mechanism for actuating the switch 236 by indicia on the tape 23 which occupies a position beneath the sole portion of the stocking is similar to that employed in connection with the tapes 22 and 24 except that no provision is made for adjusting the switch either vertically or laterally. Provision is made, however, for compensating for variations in the distances between the indicia on the tape. The switch 236 is pivoted at 270 on a bracket 271 carried by a plate 272 secured to a supporting block 273 by studs 274. Adjusting screws 275 and 276 pass through threaded apertures in the plate 272 and engage the forward side of the switch 236 for the purpose of tilting the switch about its pivot and bringing its plunger 236a into operative position with respect to the switch actuating lever 277. These adjusting screws may be secured in the desired positions by lock nuts 278. The block 273 extends rearwardly and is secured to a bracket 280 of irregular shape which provides support for the switch actuating wheels 281 and 282 as well as for two guide rollers 283 between which the tape 23 passes as it moves upwardly from the reel 33. The wheel 281 which has a cylindrical surface of a width at least as great as the tape 23, is mounted to rotate on a shaft 284 fixed in bosses which form parts of the frame 280. The other switch actuating wheel 282 is journaled in a bearing 285 carried by the lever 277 and this lever is in turn journaled on a shaft 286 which is mounted in a boss formed in the lower part of the bracket 280. Thus, when indicia on the tape pass between the rolls 281 and 282 the increased thickness causes a separation of the wheels which is magnified by the length of the lever 277 so that the upper end 277a thereof actuates the switch 236 to cause the operation of the clutch actuating solenoid 128 to arrest the movement of the conveyor belts 27 and 28 by which the sole portion of the stocking is moved rearwardly over the table.

The tape 23 passes upwardly from the wheels 281 and 282 and over the roll 39 on the shaft 60, being held in contact with this roll by one of the small rollers 41 as previously described. In order to effect a variation in the length of the tape 23 between the contacting portions of the wheels 281 and 282 and the location where the transfer is made, a lever arm 288 is pivotally mounted on the shaft 43a and secured in adjusted position by a setscrew 289. This arm carries at its free end a roller 290 which is adapted to contact with the forward side of the tape 23 and, by adjusting the angular position of this arm on the shaft 43a, a partial loop of any desired extent may be formed in the tape 23 between the wheel 281 and the roll 39, thereby causing an indicia to be precisely located in the transfer position with respect to the sole of a stocking at the same time that the switch 236 is actuated by indicia on the tape between the wheels 281 and 282.

After the tapes 22, 23 and 24 have passed over the table 21 they extend downwardly through slots in the table and are wound around the reels 50, 51 and 52, as previously referred to. The belts 92, 118 and 136, shown in Fig. 10, extend downwardly from the driving shaft 85 and each belt extends around a separate pulley 300 mounted to rotate about a shaft 301 which has its ends secured in bearings carried by the side frame members 20a. Each pulley 300 has two annular grooves, one of which is engaged by one of the belts just referred to, while the other groove is engaged by one of the belts 302, 303 or 304 which drive the reels 50, 51 and 52, respectively, as shown in Fig. 1.

Figures 16, 17, 18:
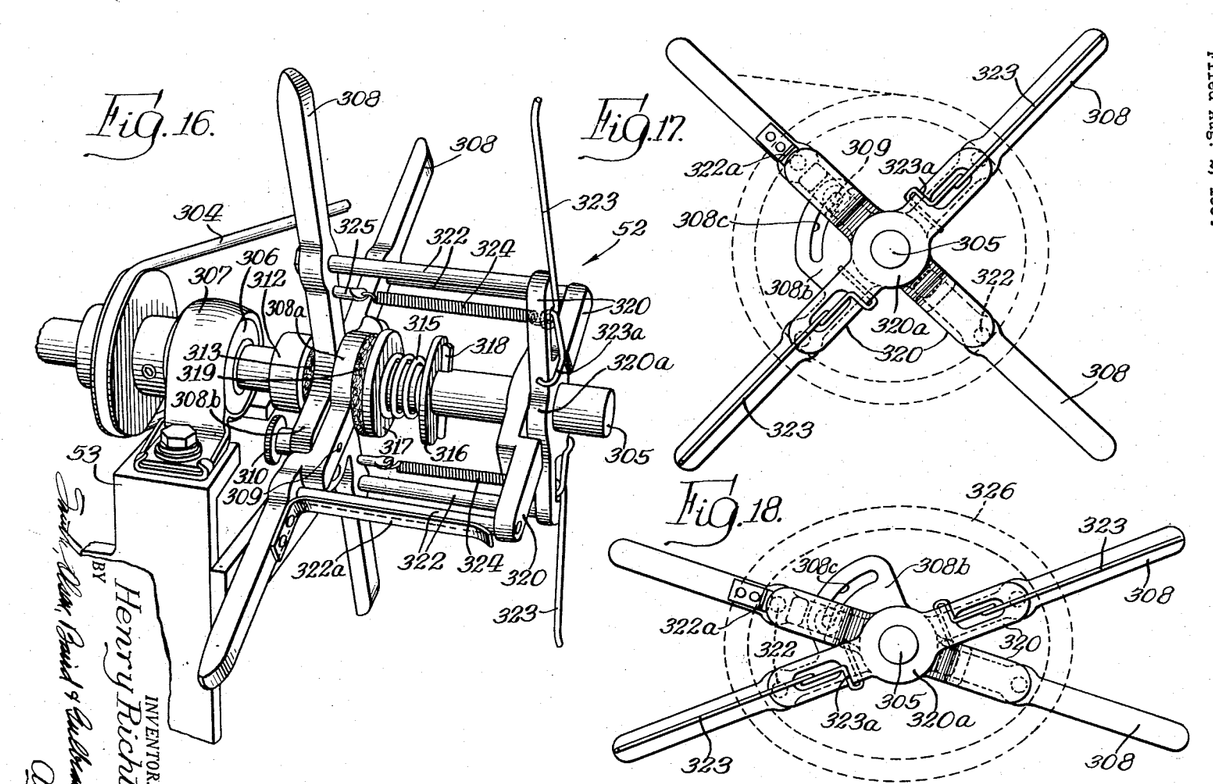
Fig. 16 shows a perspective view of one of the winding reels by which a tape is rewound in a coil after the indicia have been transferred therefrom to the hosiery.
Fig. 17 is an end elevation of the reel shown in Fig. 16 when it is expanded to retain the coil.
Fig. 18 is an end elevation similar to that of Fig. 17, showing the reel collapsed to permit removal of the coil.

The construction and driving connections of the reels 50, 51 and 52 are all alike and a description of the reel 52 and its connections, shown in Figs. 16, 17 and 18, will suffice for all of them. The reel 52 is mounted upon a shaft 305 which is provided with annular bearing members 306 journaled in bearings 307 carried by the bearing blocks 53 previously mentioned. The reel 52 comprises a pair of cross bars 308 each of which includes a hub portion 308a journaled upon the shaft 305. One of these hub portions 308a is provided with an integral plate 308b having an arcuate slot 308c through which there extends a stud 309 secured in the hub portion of the other member 308. The threaded end of this stud is engaged by a clamping nut 310 adapted to be adjusted for the purpose of clamping the two cross bars 308 in positions at right angles to each other, as shown in Fig. 16, or in the collapsed condition shown in Fig. 18. A collar 312 is secured on the shaft 305 between the inner bar 308 and the adjacent bearing 307 and a gasket 313 is mounted around the shaft adjacent this collar. The two cross bars 308 are forced against the gasket 313 by a coil spring 315 which is mounted on the shaft 305 between two disks 316 and 317. The disk 316 is secured against endwise movement by a key 318 extending through a transverse slot in the shaft and the other disk 317 is adapted to compress a gasket 319 against the hub portion of the adjacent cross bar 308 so that the cross bars are held in close frictional engagement and may be turned with respect to each other only by the application of force after the locking nut 310 has been released.

The other end portion of the reel is formed by two cross bars 320 which are shorter than the bars 308 and which have hub portions 320a journaled upon the shaft 305. The outer ends of the cross bars 320 are connected to opposite intermediate portions of the cross bars 308 by rods 322 and these rods form the hub of the reel 52 about which the transfer tape is adapted to be wound after the indicia have been removed therefrom. To facilitate the starting of this winding operation, a leaf spring 322a is secured to one arm of a cross bar 308 and arranged to lie in proximity to one of the rods 322 so that the end of the tape may be inserted between the spring and the rod at the commencement of the winding operation.

Since the cross bars 320 are shorter than the cross bars 308, for a purpose hereinafter described, it is necessary to provide extensions on the arms of one of the cross bars 320 in order to retain the coil of tape on the reel during the winding operation. These extensions are in the form of two wires or rods 323 divided at their inner ends 323a pivotally mounted in apertures which are formed in the hub portion of one of the cross bars 320. These extensions 323 normally extend radially outward as shown in Fig. 16, being held in that position by coil springs 324 which engage loops in the extensions 323 and extend across the reel with their opposite ends secured in pins 325 carried by the opposite cross bar 308. In this way, the extensions 323 are held in radial positions by the springs 324 contacting the outer face of one of the cross bars 320.

When it is desired to remove a coil of tape from a reel, the locking nut 310 is released and the cross bars 308 are relatively rotated as well as the cross bars 320, to cause them to assume the collapsed condition shown in Fig. 18. The annular distance around the rods 322 is then less than it is when they are in the position shown in Fig. 16 so that the coil of material indicated by dotted lines at 326 may be moved endwise over the outer ends of the cross bars 320 against the tension of the springs 324 until they allow the coil 326 to be withdrawn over them. The extensions 323 will then snap back to their normal positions and the cross bars 308 and 320 may be restored to the relative positions shown in Fig. 16.

Figure 15:
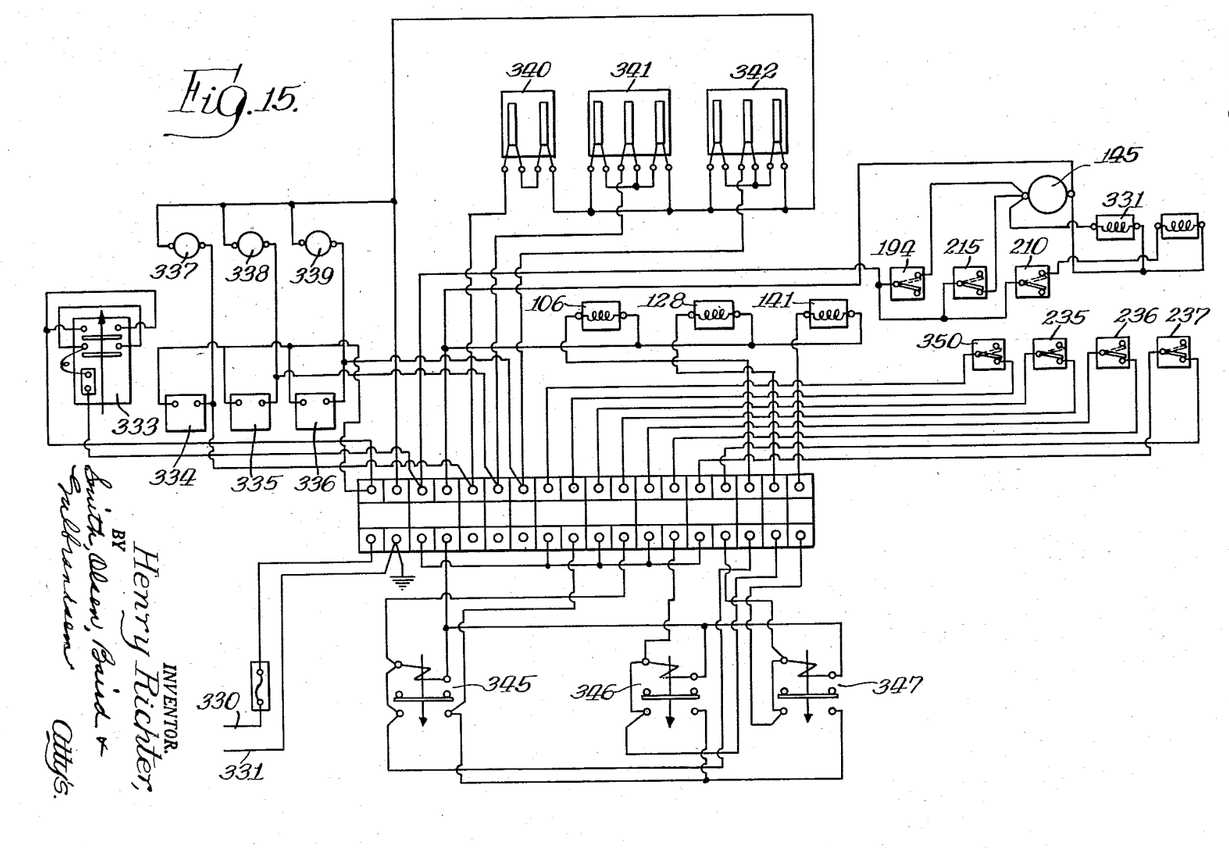
Fig. 15 is a diagrammatic view of the electric circuit by which various parts of the machine are controlled.

The connections of the switches which have been referred to above and other features of the operating electric circuit are shown in Fig. 15, where the alternating current for the circuit is indicated as being supplied through line conductors 330 and 331. A cut-off switch 333 is included in the circuit to permit it to be manually disconnected by the operator when the machine is not in use. Three manually operated switches 334, 335 and 336 are provided for closing the circuits of the heating shoes 47, 48 and 49 and pilot lights 337, 338 and 339 are provided to indicate when the circuits of the heating shoes are closed. Thermostatic devices 340, 341 and 342 are connected in circuit with the shoes to control automatically the degree of heating thereof.

The closing of the switch 333 renders the circuit operative and when the switch 194 is closed, either by operating the lever 195 or the foot pedal 196, the motor 145 is started in operation and the brake solenoid 331 is energized. The rotation of the cam shaft 149 then raises the heating shoes 47, 48 and 49 to the elevated positions shown in Fig. 9 which causes the switch 215 to assume its normally closed position. If the finger 197 drops off the hosiery, the normally closed switch 215 is opened and the motor 145 is stopped, as previously described, and the brake shoe 331 is deenergized.

The microswitches 235, 236 and 237 are closed by the indicia on the tapes and, since the closing is effected by the first portions of the indicia which strike the plungers, means must be provided for establishing holding circuits for the clutch operating solenoids 106, 128 and 141 so that the circuits of these solenoids will not be immediately opened when the plungers of the switches are released by the passing of the first portions only of the indicia. Accordingly, three relays 345, 346 and 347 are provided and they are energized when the microswitches are closed to maintain the circuits of the clutch operating solenoids until the indicia on the tapes have passed the plungers of the switches. The relays 345, 346 and 347 can only be energized when the plunger 348a of a switch 348 is on the low part of a cam 350 (Fig. 9) fixed on the cam shaft 149. After the transfer operation has been completed by the pressure platens and the heating shoes, the shaft 149 will have carried the cam 350 around to the point where the plunger 348a then rides on the high part of the cam, with the result that the switch 350 is opened and remains open until the microswitches 235, 236 and 237 are again operated by the next following indicia on the tapes. When the switch 350 is opened the clutch solenoids 106, 128 and 141 are de-energized so that the clutches automatically close to permit the movement of the conveyor belts and the tapes to resume.

Although one form of the invention has been shown and described by way of illustration, it will be understood that it may be constructed in various other embodiments which come within the scope of the appended claims. In the claims the apparatus is referred to in connection with the application of indicia to hosiery but the invention may be employed in connection with other articles of fabric or other material.

I claim:

1. The combination in apparatus for transferring indicia to hosiery, of means for supporting a plurality of tapes each carrying equally spaced raised indicia to be transferred, means for moving said tapes step by step toward a transfer position, means for supporting hosiery in spaced relation while resting on said tapes and moving them step by step to said position, means for synchronizing the movements of the tapes, and means for applying heat and pressure to the tapes at the transfer position.

2. The combination in apparatus for transferring indicia to hosiery, of means for supporting a plurality of tapes each carrying equally spaced raised indicia, means for moving said tapes step by step toward a transfer position, means for supporting hosiery in spaced relation and moving them step by step to said position, means for effecting relative adjustment of said tapes to locate the indicia thereon in predetermined relation to the hosiery in said position, and means at said transfer position for effecting transfer of the indicia from said tapes to the hosiery.

3. The combination in apparatus for transferring indicia to hosiery, of means for supporting a plurality of tapes each carrying equally spaced raised indicia, separate conveying means for supporting different portions of the hosiery and moving them to a transfer position, means for causing each of said tapes to move in unison with one of said conveying means, means actuated by indicia on each of said tapes in another position for separately stopping one of said conveying means and that tape when the portion of hosiery on that conveyor reaches said transfer position, and means at said transfer position for effecting transfer of the indicia from said tapes to the hosiery.

4. The combination in apparatus for transferring indicia to hosiery, of means for supporting a plurality of tapes each carrying equally spaced raised indicia, separate conveying means for supporting different portions of the hosiery and moving them to a transfer position, means for causing each of said tapes to move in unison with one of said conveying means, driving means adapted to operate continuously, separate means for connecting said driving means with each of said conveyors, and means at said transfer position for effecting transfer of the indicia from said tapes to the hosiery.

5. The combination in apparatus for tranferring indicia to hosiery, of means for supporting a plurality of tapes each carrying equally spaced raised indicia, separate conveying means for supporting different portions of the hosiery and moving them to a transfer position, means for causing each of said tapes to move in unison with one of said conveying means, driving means adapted to operate continuously, separate means for connecting said driving means with each of said conveyors, means for automatically stopping said driving means when there is no hosiery on said conveyors in a predetermined location, and means at said transfer position for effecting transfer of the indicia from said tapes to the hosiery.

6. The combination in apparatus for applying indicia to hosiery, of means for supporting a plurality of tapes each carrying equally spaced raised indicia, a pair of parallel shafts, a plurality of endless belts for carrying hosiery to a transfer position, means for supporting said belts on said shafts, means including a plurality of clutches for actuating said belts independently of each other, means for causing each of said tapes to move in unison with one of said belts, and means at said transfer position for effecting transfer of the indicia from said tapes to the hosiery.

7. The combination in apparatus for applying indicia to hosiery, of means for supporting a plurality of tapes each carrying equally spaced raised indicia, a pair of parallel shafts, a plurality of endless belts for carrying hosiery to a transfer position, means for supporting said belts on said shafts, means including a plurality of clutches for actuating said belts independently of each other, means actuated by said indicia on said tapes for controlling the operation of said clutches, and means at said transfer position for effecting transfer of the indicia from said tapes to the hosiery.

8. The combination in apparatus for transferring indicia to hosiery, of a table adapted to support a tape carrying equally spaced raised indicia, means for actuating said tape to move said indicia successively to a transfer position, a conveyor movable to said position and adapted to support hosiery resting on said tape, and means for applying heat and pressure to said tape in said transfer position.

9. The combination in apparatus for transferring indicia to hosiery, of a table adapted to support a tape carrying equally spaced raised indicia, means for actuating said tape to move said indicia successively to a transfer position, a conveyor movable to said position and adapted to support hosiery resting on said tape, a heating shoe located beneath said tape in said transfer position, and a pressure platen located above said tape and movable downwardly to press said hosiery and an indicia against said shoe in said position.

10. The combination in apparatus for transferring indicia to hosiery, of a table adapted to support a tape carrying equally spaced raised indicia, means for actuating said tape to move said indicia successively to a transfer position, a conveyor movable to said position and adapted to support hosiery resting on said tape, a heating shoe located beneath said tape in said transfer position, a pressure platen located above said tape and movable downwardly to press said hosiery and an indicia against said shoe in said position, and means for lowering said heating shoe from said tape and simultaneously stopping the operation of said apparatus.

11. The combination in apparatus for transferring indicia to hosiery, of a table adapted to support a tape carrying equally spaced raised indicia, means for actuating said tape to move said indicia successively to a transfer position, a conveyor movable to said position and adapted to support hosiery resting on said tape, a heating shoe located beneath said tape in said transfer position, a pressure platen located above said tape and movable downwardly to press said hosiery and an indicia against said shoe in said position, and means actuated when there is no hosiery in a predetermined position on said tape for lowering said shoe and stopping the operation of said apparatus.

12. The combination in apparatus for transferring indicia to hosiery, of a table adapted to support a tape carrying equally spaced raised indicia, means for actuating said tape to move said indicia successively to a transfer position, a conveyor movable to said position and adapted to support hosiery resting on said tape, a heating shoe located beneath said tape in said transfer position, a pressure platen located above said tape and movable downwardly to press said hosiery and an indicia against said shoe in said position, and a plurality of means for lowering said shoe and thereby stopping the operation of said apparatus.

13. The combination in apparatus for transferring indicia to hosiery, of a conveyor for moving hosiery to a transfer position, means for actuating said conveyor, means for moving with said conveyor and beneath said hosiery a tape carrying raised equally spaced indicia, a pair of wheels between which said tape passes, said wheels being adapted to have relative movement when an indicia passes between them, means for magnifying the relative movement of said wheels, and means actuated by said last named means for stopping the operation of said conveyor and said moving means.

References Cited in the file of this patent

UNITED STATES PATENTS

| | | |
|---|---|---|
| 1,638,586 | Lee | Aug. 9, 1927 |
| 1,727,634 | Clouse et al. | Sept. 10, 1929 |
| 2,136,025 | Shorrock | Nov. 8, 1938 |
| 2,286,458 | Bowman et al. | June 16, 1942 |
| 2,323,843 | Richter et al. | July 6, 1943 |
| 2,501,539 | Ruth | Mar. 21, 1950 |
| 2,597,145 | Gallagher | May 20, 1952 |
| 2,674,056 | Schwartz et al. | Apr. 6, 1954 |